United States Patent [19]

Conklin

[11] 4,219,602
[45] * Aug. 26, 1980

[54] ELECTRICALLY CONDUCTIVE/ANTISTATIC SHEETING

[75] Inventor: Christine Conklin, Newark, N.J.

[73] Assignee: Herculite Protective Fabrics Corporation, New York, N.Y.

[*] Notice: The portion of the term of this patent subsequent to Jun. 24, 1992, has been disclaimed.

[21] Appl. No.: 681,643

[22] Filed: Apr. 29, 1976

[51] Int. Cl.² ................................................ B32B 5/16
[52] U.S. Cl. ................................... 428/244; 156/315; 156/334; 428/246; 428/247; 428/250; 428/252; 428/287; 428/309; 428/408; 428/409; 428/907; 428/921; 156/292; 156/308.2
[58] Field of Search ............... 428/237, 238, 244, 247, 428/250, 252, 255, 267, 269, 287, 309, 316, 320, 408, 494, 920, 921, 367, 409, 907; 260/42.22; 156/306, 315, 334

[56] References Cited

U.S. PATENT DOCUMENTS

| | | | |
|---|---|---|---|
| 3,332,055 | 7/1967 | Bogner | 260/42.22 |
| 3,629,154 | 12/1971 | Johnson | 260/42.22 |
| 3,891,786 | 6/1975 | Conklin | 428/244 |

*Primary Examiner*—James J. Bell
*Attorney, Agent, or Firm*—Sughrue, Rothwell, Mion, Zinn and Macpeak

[57] ABSTRACT

A multi-layered sheeting material is disclosed whereby conductive properties are imparted to one surface and antistatic properties are imparted to the other. In a further embodiment, the sheeting material contains a reinforcing layer. This light-weight sheeting material may be used in applications whereby the accumulation of electrical charge may be dangerous, e.g. in the presence of volatile and flammable materials.

38 Claims, No Drawings

ELECTRICALLY CONDUCTIVE/ANTISTATIC SHEETING

BACKGROUND OF THE INVENTION

This invention relates to sheeting which is electrically conductive on one surface and antistatic on the opposite surface. Such sheeting is especially suited to use in environments where accumulation of static electricity on the surface of the sheeting material would be hazardous.

Various coated or laminated fabrics having electrically conductive films bonded to the exterior surface of a base fabric, e.g. a cotton fabric are available. However, in view of the poor adhesion of the coating to the base woven fabric, the conductive coating tends to abrade, crock or crack and thus tends to become separated from the fabric. Therefore, it is difficult in such laminates to provide an integral material with a substantial useful lifetime.

In my U.S. Pat. No. 3,891,786, which is assigned to the assignee of the present application, an electrically conductive sheeting is described whereby a rubber composition containing about 25 to about 40% by weight of an electrical grade carbon black is coated onto a plastic layer. Before or after application of this coating, the plastic layer is perforated. The perforations may be sealed thereafter by a suitable heat-sealing with heated rollers or the like. Conductive properties are thus provided on the surface of the fabric.

References cited during the prosecution of U.S. Pat. No. 3,891,786 provide a background of the prior art in this area. Thus, U.S. Pat. No. 3,783,085 describes laminated articles which may comprise fabric layers containing a core of activated charcoal particles and a powdered thermoplastic adhesive. The function of the activated charcoal component is to absorb toxic vapors as contaminated air passes through the air-permeable substrates of the fabric.

SUMMARY OF THE INVENTION

The present invention comprises a sheeting material having electrically conductive properties on one surface and antistatic properties on the opposite surface. In a basic embodiment, an electrically conductive coating is applied to a non-porous plastic substrate layer, the uncoated surface of which is then adhered to a second non-porous plastic layer by means of a plastisol. Incorporation of a flame retardant agent and/or an antibacterial agent into various layers can provide flame resistant and/or antibacterial properties to the sheeting. Further, provision of a reinforcing layer between the two non-porous plastic layers imparts excellent physical properties, such as, surface texture and strength, to the conductive/antistatic laminated sheeting of the present invention.

DETAILED DESCRIPTION OF THE INVENTION

The present invention relates to sheeting materials which are electrically conductive on one surface and which are composed of a laminated or multi-layer construction comprising of at least two layers. The sheeting of the present invention can dissipate or deflect radiant energy.

In the following discussion, the electrically conductive coating will be referred to as Ply 1, the non-porous plastic film in contact with Ply 1 will be referred to as Ply 2, the optional plastisol adhesive adhered to Ply 2 will be referred to Ply 3, the optional reinforcing layer between the two non-porous plastic layers, therefore within the plastisol adhesive, will be referred to as Ply 4 and the final optional non-porous plastic layer adhered to Ply 2 by means of the plastisol adhesive will be referred to as Ply 5.

Ply 1 contains an electrically conductive filler and, thus, can be any natural or synthetic rubber composition capable of accepting about 40% or more of electrical grade carbon black filler and capable of being adherently applied as a layer to the selected plastic substrate Ply 2. Preferably, the rubber composition is an acrylonitrile-butadiene rubber composition although other suitable rubber compositions include polyurethane, polychloroprene and other latex or solvent coatings which are capable of accepting the electrically conductive material and compatible with the plastic substrate Ply 2. The electrically conductive filler can be present in Ply 1 in varying amounts, depending upon the desired properties of the final product. Preferably, the electrically conductive filler is present in an amount of from about 25 to about 40% by weight of the rubber composition used Ply 1. The electrically conductive filler is preferably carbon black, but may also be powdered metal and mixtures of carbon black and powdered metal. Ply 1 can be present in the laminate to the extent of about $\frac{1}{2}$ to 1 oz./yd$^2$ in a thickness of about $\frac{1}{2}$ to 1 mil.

Ply 2 is a non-porous plastic layer having a thickness of up to about 20 mils, preferably up to about 10 mils and most preferably about 2 to 4 mils. Preferably, the plastic layer can be a polyurethane, polyolefin, polyester, polyvinylchloride, chlorosulfonated polyethylene, e.g. hypalon, polychloroprene (neoprene) and other suitable plastic substrates. Most preferably, Ply 2 is composed of a polyvinyl chloride material. In general, Ply 2, prior to coating, has a surface resistivity of about $1.5 \times 10^{12}$ ohms on both exterior surfaces.

Ply 3 is a cementing composition, preferably a plastisol adhesive as known in the art. This layer is optionally utilized when Ply 5 is incorporated into the sheeting material of the present invention. However, Ply 5 can be bonded to the surface of Ply 2 on the side opposite from Ply 1 by a simple heat and pressure operation. Most preferably, Ply 3 is used when both Plies 4 and 5 are incorporated into the sheeting of the present invention. Thus, the term "plastisol" should be understood to include plastisols, polymer solutions, polymer-in-liquid emulsions and 100% solids liquid polymers. Preferably Ply 3 comprises a polyvinylchloride plastisol comprising polyvinylchloride and a plasticizer, e.g. dioctylphthalate or tricresyl phosphate. Ply 3 can be used in varying amounts according to the desired properties of the final product but is preferably used in an amount such that its weight is about 2 oz./yd$^2$.

Ply 4, which is optional in the present invention, can be any reinforcement which is compatible with the present invention. Therefore, an open scrim of a high-strength material such as nylon, polyester or metal can be used as Ply 4 in the present invention. In addition to strength, Ply 4 provides an excellent texture to the final product whereby it is rendered slip resistant. Preferably, Ply 4 is an open nylon scrim having a weight of about 1.5 oz/yd$^2$.

Ply 5, which is optional, can be materials such as those described above in the discussion of Ply 2. However, Ply 5 need not be identical to Ply 2 in the laminate product itself.

Flame resistant properties can be imparted to the laminate of the present invention by the incorporation of a flame retardant agent into Ply 2, Ply 3 or Ply 5 or into any combination of these plies. Although the flame retardant agent can be present in Ply 1, this is not particularly advantageous since Ply 1 already contains substantial amounts of the electrically conductive filler material. A preferred flame retardant agent is antimony oxide.

Antibacterial properties may be incorporated in the laminate of the present invention by the incorporation of an antibacterial agent into Ply 2, Ply 3 or Ply 5 or any combination of these plies. By the migration of the antibacterial agent through the laminate from the ply in which it was originally placed, antibacterial activity may be found at the surfaces of the laminate. Preferred antibacterial agents are bis (tri-n-butyl tin) sulfosalicylate and Captan N-[(trichloromethyl) thio]-4cyclohexene-1,2-dicarboximide. When these two agents are utilized together in the laminate, they are utilized in preferred amounts of up to about 0.62% and 0.30% by weight of the entire laminate respectively.

The laminate of the present invention generally retains the specific properties of the initial plastic layers used as Plies 2 and 5 as well as any reinforcement used as Ply 4. Thus, the invention allows for building a wide variety of aesthetic mechanical, and chemical properties into the laminate products, in addition to the desired electrical conductivity and antistatic properties. For example, a colored polyvinylchloride layer may be used as Ply 5.

In constructing the laminate of the present invention, Ply 2 is coated and thereby bonded with the rubber layer, Ply 1. The surface of Ply 1 was thus found to have a resistivity of $5 \times 10^3$ ohms which is conductive in terms of the standards of the National Fire Protection Association test procedures reported in NFPA 56A Bulletin at page 40, Section 254, "Accessories", paragraph 2541, "Conductive Covers and Sheetings". The test requirement under specified conditions calls for the resistance between two electrodes on the same surface of the sheeting not to exceed $10^6$ ohms. The uncoated surface of Ply 2 at this point has a resistivity of about $1 \times 10^8$ ohms which is antistatic in terms of the NFPA, i.e. less than $10^{11}$ ohms.

After construction of the laminate sheeting comprising Plies 1 and 2 mentioned above, a further laminate can optionally be prepared by the application of Ply 5, optionally in the presence of Ply 4, followed by heat and pressure upon the entire construction to produce a further laminate of the present invention. Preferably, this laminating process is conducted at about 300° F. at 50 psi between laminating rolls. However, any method used for such laminating is usable in the present invention. Preferably, a cementing Ply 3 is used when optional Ply 5 or optional Plies 4 and 5 are incorporated into a laminate of the present invention.

After the construction of a five-ply laminate as indicated above, it was found that the exterior surface of Ply 5 had a resistivity of about $2 \times 10^{10}$ ohms, a substantial reduction from its resistivity prior to lamination of about $1.5 \times 10^{12}$ ohms. Thus, the laminate was found to be conductive at the surface of Ply 1 and antistatic at the surface of Ply 5. The reduction in resistivity at the surface of Ply 5 is probably caused by the penetration of the conductive compound from the surface of Ply 2 to the surface of Ply 5 during the lamination process.

A laminate prepared utilizing polyvinylchloride as Plies 2 and 5 as above but without the use of Ply 1 was found to have a resistivity on either surface of about $1 \times 10^{12}$ ohms.

In addition, the above process may be supplemented by operations such as embossment, or other decoration processes.

Laminates prepared according to the present invention were found not to shed a carbon black residue, and found to resist excreta, most medicaments, oils and greases. Further, the laminates could be easily cleaned by simply wiping with water and soap or mild cleaners. Thus, the conductive/antistatic fabrics prepared according to the present invention find utilization as mattress ticking, covers for wheeled stretcher pads, pillows, traction bags as well as other hospital applications. Further, the laminates find use in many applications where the buildup of static electricity can be dangerous, e.g. in the presence of volatile and flamable materials and in the presence of heat-sensitive materials such as ammunition.

The invention will more fully be understood by reference to the following specific examples which should not be taken as limiting the invention in terms of materials, proportions or process steps utilized.

EXAMPLE 1

A conductive/antistatic laminated sheeting was made by coating a surface of flexible polyvinylchloride having a thickness of about 4 mils by the application of a coating of the following composition in an amount of about 1 oz./yd$^2$:

7.5 grams of electrical grade carbon black, and
19 part of acrylonitrile-butadiene rubber blended with
polyvinylchloride resins and containing 81 parts of a solvent blend of 50/50 methylethyl ketone/toluene.

After drying to remove the solvent, the coated surface of the polyvinylchloride film, which had a resistivity of $1.5 \times 10^{12}$ ohms prior to coating, was found to be conductive and had a resistivity of $5 \times 10^3$ ohms, the uncoated surface was found to be antistatic and has a resistivity of $1 \times 10^8$.

EXAMPLE 2

The sheeting produced in Example 1 was then further laminated by means of a plastisol containing about equal parts by weight of polyvinylchloride and dioctylphthalate applied to the polyvinylchloride surface of the sublaminate and the surface of a second polyvinlychloride film having a thickness of about 4 mils. The lamination was conducted by the passage of the layers through laminating rollers at about 50 psi and at about 300° F.

The conductive coating surface of the thus-formed laminate was found to have a resistivity of $5 \times 10^3$ ohms while the opposite face was found to have a resistivity of $2 \times 10^{10}$ ohms.

EXAMPLE 3

A conductive/antistatic laminated sheeting was constructed as set forth in Example 2 with the exception that an open nylon scrim of $18 \times 17$ threads per square inch and a weight of about 1.5 oz/yd$^2$ was provided as Ply 4 between the polyvinylchloride face of the sublaminate and a polyvinylchloride face of Ply 5.

The thus-formed laminated was found to have an excellent breaking strength on the order of about 85 pounds per inch as well as a slip resistant texture. The laminate was found to maintain electrical conductivity on the face of Ply 1 after comprehensive testing that included two months accelerated aging at 160° F., five days immersion in No. 30 motor oil and 15 minutes immersion in ethylether as required by the Underwriters Laboratories. Additionally, the laminate was found to have excellent tear resistance and and abrasion resistance.

It will be apparent to those skilled in the art that modification may be made in the product and processes described herein without departing from the spirit and scope of the invention as expressed in the following claims.

What is claimed is:

1. A flexible sheeting having conductivity and a surface resistivity of less than $10^6$ ohms on one surface thereof, comprising:
   a first layer of a rubber composition filled with from about 25 to about 40 percent by weight of an electrically conductive filler selected from the group consisting of carbon black, powdered metal and mixtures thereof, the percent by weight of said electrically conductive filler being based on the total weight of the rubber and the electrically conductive filler in said composition; and
   a second layer of a plastic film material which, prior to incorporation in said sheeting, has a surface resistivity of at least $10^6$ ohms and which is bonded to said first layer.

2. The sheeting of claim 1, further comprising a third layer of a plastic film material bonded to said second layer on the side opposite said first layer.

3. The sheeting of claim 2, further comprising a cementing layer interposed between said second and third layers.

4. The sheeting of claim 2, further comprising a reinforcing element between said second and third layers.

5. The sheeting of claim 4, wherein said reinforcing element is a nylon scrim.

6. The sheeting of claim 2, wherein said second and third layers are films of polyvinylchloride.

7. The sheeting of claim 1, wherein said rubber composition is an acrylonitrile-butadiene rubber composition.

8. The sheeting of claim 1, wherein said sheeting further comprises an amount of a flame retardant agent sufficient to improve the flame retardancy of said sheeting.

9. The sheeting of claim 8, wherein said flame retardant agent is antimony oxide.

10. The sheeting of claim 1, wherein said sheeting further comprises an amount of antibacterial agent sufficient to improve the antibacterial activity of the surface of said sheeting.

11. The sheeting of claim 10, wherein said antibacterial agent is N-[(trichloromethyl) thio]-4-cyclohexene-1,2-dicarboximide.

12. The sheeting of claim 1, wherein the surface of said second layer opposite said first layer, which had a surface resistivity of over $10^{11}$ ohms before incorporation into said sheeting, is antistatic and has a surface resistivity of less than $10^{11}$ ohms after incorporation into said sheeting.

13. The sheeting of claim 12, wherein said surface resistivity of less than $10^{11}$ ohms after incorporation into said sheeting is about $10^8$ ohms.

14. The sheeting of claim 2, wherein the surface of said third layer opposite said second layer, which had a surface resistivity of over $10^{11}$ ohms before incorporation into said sheeting, is antistatic and has a surface resistivity of less than $10^{11}$ ohms.

15. The sheeting of claim 14, wherein said surface resistivity of less than $10^{11}$ ohms is about $10^{10}$ ohms.

16. The sheeting of claim 1, wherein said surface resistivity of less than $10^6$ ohms is about $10^3$ ohms.

17. A method for producing a flexible sheeting having conductivity and a surface resistivity of less than $10^6$ ohms on one surface thereof, comprising:
   providing a first layer of a rubber composition filled with from about 25 to about 40 percent by weight of an electrically conductive filler selected from the group consisting of carbon black, powdered metal and mixtures thereof, the percent by weight of said electrically conductive filler being based on the total weight of the rubber and the electrically conductive filler in said composition;
   bonding to said first layer, a second layer of a plastic film material which, prior to incorporation in said sheeting had a surface resistivity of at least $10^6$ ohms;
   bonding to said second layer on the side opposite from said first layer, a third layer of a plastic film material; and
   bonding a reinforcing element between said second layer and said third layer.

18. The method of claim 17, further comprising a cementing layer interposed between said second and third layers.

19. The method of claim 17, wherein said reinforcing element is a nylon scrim.

20. The method of claim 17, wherein said second and third layers are films of polyvinylchloride.

21. The method of claim 17, wherein said rubber composition is an acrylonitrile-butadiene rubber composition.

22. The method of claim 17, further comprising the incorporation into said sheeting of amount of a flame retardant agent sufficient o improve the flame retardance of said sheeting.

23. The method of claim 22, wherein said flame retardant agent is antimony oxide.

24. The method of claim 17, further comprising the incorporation into said sheeting of amount of antibacterial agent sufficient to improve the antibacterial activity of the surface of said sheeting.

25. The method of claim 24, wherein said antibacterial agent is N-[(trichloromethyl) thio]-4-cyclohexene-1,2-dicarboximide.

26. The method of claim 17, wherein the surface of said second layer opposite said first layer, which had a surface resistivity of over $10^{11}$ ohms before incorporation into said sheeting, is antistatic and has a surface resistivity of less than $10^{11}$ ohms after incorporation into said sheeting.

27. The method of claim 26, wherein said surface resistivity of less than $10^{11}$ ohms after incorporation into said sheeting is about $10^8$ ohms.

28. The method of claim 17, wherein the surface of said third layer opposite said second layer, which had a surface resistivity of over $10^{11}$ ohms before incorporation into said sheeting, is antistatic and has a surface resistivity of less than $10^{11}$ ohms.

29. The method of claim 28, wherein said surface resistivity of less than $10^{11}$ ohms is about $10^{10}$ ohms.

30. The method of claim 17, wherein said surface resistivity of less than $10^6$ ohms is about $10^3$ ohms.

31. The sheeting of claim 1, wherein said second layer is a non-porous plastic film.

32. The method of claim 17, wherein said second layer is a non-porous plastic film.

33. The sheeting of claim 1, wherein said electrically conductive filler is carbon black and said second layer is a film of polyvinylchloride.

34. The sheeting of claim 1, wherein said electrically conductive filler is carbon black and said second layer is a film of polyvinylchloride, further comprising
a third layer of a polyvinylchloride film, bonded to said said second layer on the side opposite said first layer by means of a polyvinylchloride plastisol, and
an open scrim reinforcing element between said second and third layers.

35. The sheeting of claim 34, wherein said rubber composition is an acrylonitrile-butadiene rubber composition and said open scrim is a nylon scrim.

36. The method of claim 17, wherein said electrically conductive filler is carbon black and said second layer is a film of polyvinylchloride.

37. The method of claim 17, wherein said electrically conductive filler is carbon black and said second layer is a film of polyvinylchloride, further comprising providing an open scrim reinforcing element and a polyvinylchloride plastisol on said second layer on the side opposite said first layer and bonding thereto a third layer of a polyvinylchloride film.

38. The method of claim 37, wherein said rubber composition is an acrylonitrile-butadiene rubber composition and said open scrim is a nylon scrim.

* * * * *